United States Patent [19]
Cholvin

[11] 3,927,524
[45] Dec. 23, 1975

[54] ENGINE EXHAUST REACTOR AIR FLOW RATIO CONTROL METHOD AND APPARATUS

[75] Inventor: Robert L. Cholvin, Santa Monica, Calif.

[73] Assignee: The Garrett Corporation, Los Angeles, Calif.

[22] Filed: Feb. 22, 1974

[21] Appl. No.: 445,000

[52] U.S. Cl. .................. 60/289; 137/117; 137/501
[51] Int. Cl.² ................... F02B 75/10; G05D 11/00
[58] Field of Search ...... 60/274, 289, 290; 137/117, 137/501, 115

[56] References Cited
UNITED STATES PATENTS

| | | | |
|---|---|---|---|
| 2,459,000 | 1/1949 | Morris | 137/117 |
| 3,059,419 | 10/1962 | Schnabel | 60/290 |
| 3,086,353 | 4/1963 | Ridgway | 60/289 |
| 3,106,820 | 10/1963 | Schaffer | 60/290 |
| 3,237,399 | 3/1966 | Hamblin | 60/289 |
| 3,360,927 | 1/1968 | Cornelius | 60/289 |
| 3,563,030 | 2/1971 | Lentz | 60/290 |
| 3,641,767 | 2/1972 | Kraus | 60/274 |
| 3,791,146 | 2/1974 | Hayashi | 60/289 |
| 3,826,089 | 7/1974 | Nakajima | 60/290 |
| 3,832,848 | 9/1974 | Scholl | 60/289 |

FOREIGN PATENTS OR APPLICATIONS

| | | | |
|---|---|---|---|
| 1,503,493 | 10/1970 | Germany | 137/117 |

*Primary Examiner*—Douglas Hart
*Attorney, Agent, or Firm*—Alfons Valukonis; Jack D. Puffer; Albert J. Miller

[57] ABSTRACT

Method and apparatus wherein secondary air is supplied by an engine driven air pump to the engine exhaust reactor for oxidizing uncombusted products produced by the engine. The ratio of secondary air flow relative to engine air flow is regulated in a predetermined manner by controlled bleeding of the air pump air to atmosphere. The air flow ratio can be maintained substantially constant, increasing, or decreasing with increasing engine air flow.

15 Claims, 4 Drawing Figures

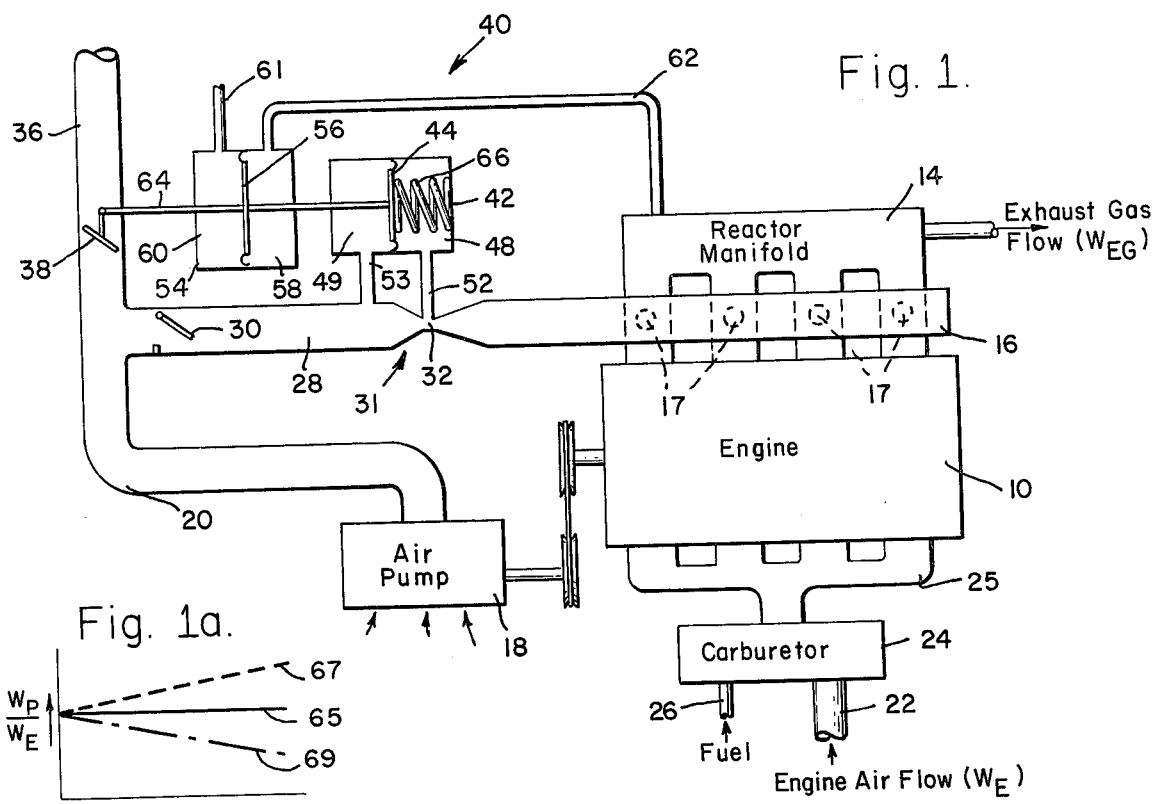
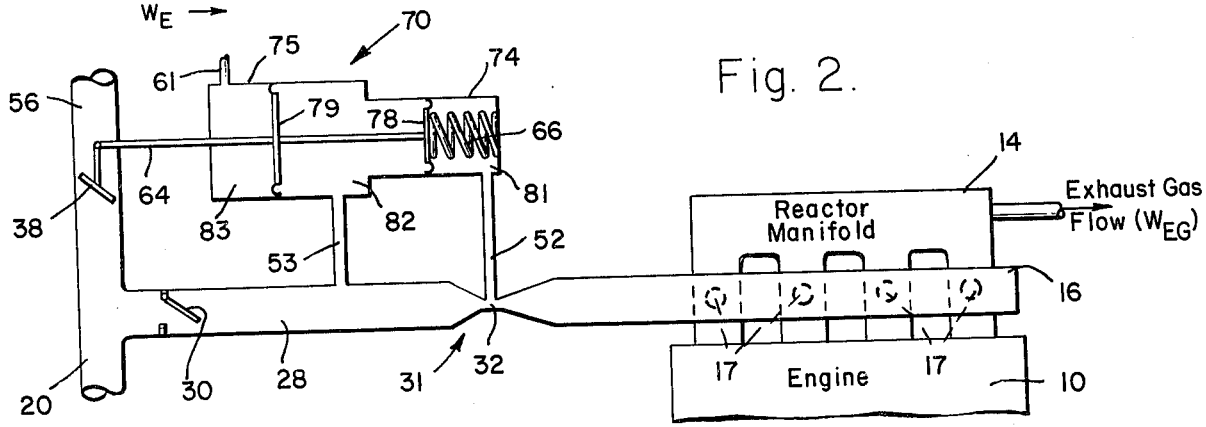
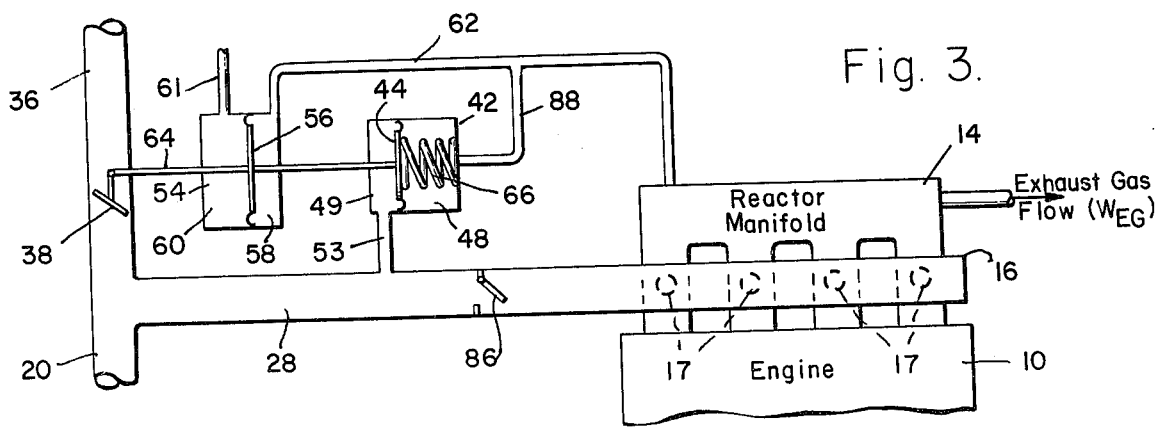

ENGINE EXHAUST REACTOR AIR FLOW RATIO CONTROL METHOD AND APPARATUS

BACKGROUND OF THE INVENTION

This invention relates generally to method and apparatus for supplying air to the exhaust reactor of an internal combustion engine and more particularly, to method and apparatus for controlling in a predetermined manner the ratio of secondary air flow to the exhaust reactor relative to engine air flow to reduce the amount of uncombusted fuel in the engine exhaust emissions.

Exhaust manifold secondary air injection reactor systems previously utilized with internal combustion engines generally satisfied the less stringent exhaust emissions standards then adopted. But, with the passage of time, exhaust emission standards have become more restrictive which rendered prior systems and approaches incapable of satisfactorily reducing the uncombusted engine exhaust products. Generally, to reduce excess engine exhaust combustibles there is need to provide control of the ratio of exhaust reactor secondary air flow relative to the air flow that passes through the engine. For example, if the ratio of fuel to engine air flow is to be held constant over the broad engine operating range, provision should also be made to hold constant the ratio of exhaust reactor secondary air flow to engine air flow to provide sufficient oxygen to burn any remaining uncombusted fuel in the exhaust emissions. Where provision is made to enrich the fuel-air mixture at high engine power, provision should also be made to increase the ratio of secondary air to engine air flow as engine power is increased to provide sufficient oxygen to burn any excess fuel in the exhaust reactor. In some instances, it may be desirable to provide capability for reducing the ratio of secondary air flow to engine air flow as engine power is increased to prevent excessive heat generation in the exhaust reactor system.

Some prior art devices are revealed in the following U.S. Pat. Nos. 3,059,419 to Schnabel; 3,060,678 to Ridgway; 3,086,353 to Ridgway; 3,106,829 to Schaffer et al.; 3,360,927 to Cornelius; 3,364,909 to Mick; 3,380,245 to Mick; 3,392,523 to Hyde et al.; 3,397,534 to Knowles; 3,430,437 to Saussele et al.; 3,433,242 to Voorheis; 3,479,816 to La Masters; and 3,520,320 to Crawford et al.

SUMMARY OF THE INVENTION

Air flow control method and apparatus for an internal combustion engine having an exhaust system reactor wherein secondary air flow to the reactor is supplied, and the secondary air flow is regulated to provide a predetermined ratio of reactor secondary air flow relative to engine air flow which varies as a function of engine air flow.

BRIEF DESCRIPTION OF THE DRAWINGS

FIG. 1 shows, schematically, an air flow ratio control system embodying the present invention;

FIG. 1a shows graphic representations helpful to the understanding of the invention;

FIG. 2 shows, schematically, another embodiment of the invention; and

FIG. 3 shows, schematically, still another embodiment of the invention.

DETAILED DESCRIPTION OF THE PREFERRED EMBODIMENTS

Reference is made to the drawings, and in particular to FIG. 1, wherein the numeral 10 designates a conventional internal combustion engine which has a reactor manifold 14. Reactor 14 can be of any conventional type for oxidizing combustibles occurring in the exhaust gases. Engine 10 is also provided with a secondary air injection manifold 16 that has a plurality of similar branch passageway connection 17 each of which terminates in engine reactor manifold 14. Secondary air manifold 16 is supplied with air pump air flow from an engine driven air pump 18 that discharges pressurized air into a conduit 20. Engine 10 also has an inlet conduit 22 for engine air flow to a conventional carburetor 24 and then to an intake manifold 25. Fuel to carburetor 24 is supplied by an inlet passage 26. Passageway 28 connects the conduit 20 and secondary air manifold 16. Passageway 28 is provided with a check valve 30, and a venturi 31 having a throat 32.

A bypass conduit 36, open at one end to the atmosphere, has its other end connected at the intersection of conduits 20 and 28. An air bleed valve 38, in the form of a butterfly valve, is positioned in bypass conduit 36 for actuation by a controller 40 to control bleeding of pump air to the atmosphere. It will be appreciated that other valves, such as a poppet valve, could be used instead of the butterfly valve.

Controller 40 has a first housing member 42 with a first diaphragm 44 mounted therein separating the interior of the housing into a pair of first and second chambers 48 and 49. Chamber 48 is connected by conduit 52 to throat 32, and chamber 49 is connected by conduit 53 to passageway 28 to provide for a pressure differential across diaphragm 44 when secondary air is flowing through passageway 28 to reactor 14.

A secondary housing 54 carries a second diaphragm 56 that separates the interior of the housing into third and fourth chambers 58 and 60. Chamber 58 is connected as by conduit 62 to reactor manifold 14 for sensing the reactor manifold pressure. An inlet 61 opens chamber 60 to the atmosphere.

A rod 64 is connected at one end to diaphragm 44. Rod 64 is passed through the adjacent walls of housings 42 and 54 in sealing and sliding engagement, and through diaphragm 56, to which it is rigidly fastened. Rod 64 is also positioned in sealing and sliding engagement through the far wall of housing 54 and has its other end pivotally secured to valve 38.

A bias spring 66, which has a predetermined spring load, is suitably positioned in chamber 48, intermediate the wall of housing 42 and diaphragm 44. The net spring load or bias of spring 66 can be predetermined to characterize the particular desired secondary air to engine air flow ratio as a function of engine air flow. The ratio can be maintained substantially constant, increasing with engine air flow, or decreasing with increasing engine air flow.

In operation, if it is desired that the ratio be substantially constant as engine air flow increases, as shown at 65 in FIG. 1a a zero spring load on diaphragm 44 is provided by eliminating spring 66 from controller 40. An air flow ratio that increases with increasing engine air flow, as graphically illustrated at 67 in FIG. 1a, can be provided for by using a spring 66 having a negative spring load, such as a tension spring. A compression spring used as spring 66, producing positive loading on diaphragm 44, will provide an air flow ratio that decreases with increasing engine air flow, as shown at 69 in FIG. 1a.

After engine 10 has been started, pressure developed in reactor 14 is sensed in chamber 58, and the differential pressure produced across diaphragm 56 serves to exert a force on the diaphragm so that rod 64 is urged in a direction such that valve 38 tends to close conduit 36. Closure of conduit 36 restricts bleed-off of pump air to the atmosphere, but tends to increase flow of secondary air through passageway 28. However, flow of secondary air through passageway 28 produces pressures which are sensed in chambers 48 and 49. The force developed on diaphragm 44 by the differential pressure produced by these pressures in chambers 48 and 49 urges rod 64 in an opposite direction such that valve 38 tends to open conduit 36. Opening of conduit 36 increases flow of pump air through conduit 36, but tends to decrease flow of secondary air through passageway 28.

With spring 66 removed, only the two opposing forces acting on diaphragms 44 and 56 serve to control positioning of valve 38, resulting in a constant air flow ratio as engine air flow increases. If a tension spring 66 is provided, an additional force is introduced which acts in a direction tending to open valve 38. The introduction of the additional tension spring force results in an increasing air flow ratio with increasing engine air flow. Where a compression spring 66 is provided, the additionally exerted force, which tends to close valve 38, produces a decreasing air flow ratio as engine air flow increases. More specifically, controller 40 operates valve 38 to control air flow ratio in accordance with the following equations:

$$W_{EG} = K_{EG} C_{EG} A_{EG} \sqrt{\Delta P_{EG} \rho_{EG}} \quad \text{Exhaust System Flow Equation} \quad (1)$$

$$W_P = K_V C_V A_V \sqrt{\Delta P_V \rho_V} \quad \text{Venturi Flow Equation} \quad (2)$$

$$W_{EG} = W_P + W_E \quad (3)$$

$$P_V = P_{EG} + 0.1 \Delta P_V \quad (4)$$

$$\frac{W_P}{W_P + W_E} = K \frac{C_V A_V}{C_{EG} A_{EG}} \sqrt{\frac{\Delta P_V P_V / T_V}{\Delta P_{EG} P_{EG} / T_{EG}}} \quad (5)$$

$$(P_V - P_{VT}) A_2 - (P_{EG} - P_A) A_1 - F_S = 0 \quad (6)$$

where:

$W_P$ = secondary air flow through passageway 28
$W_E$ = air flow through engine 10
$W_{EG}$ = exhaust gas flow from reactor 14 of engine 10
$P_V$ = venturi inlet pressure sensed in chamber 49 of the embodiment of FIG. 1, and chamber 82 of the embodiment of FIG. 2
$P_{EG}$ = pressure in reactor 14
$P_A$ = pressure of atmosphere
$P_{VT}$ = venturi throat pressure in chambers 48 and 81
$\Delta P_V = (P_V - P_{VT})$ = venturi differential pressure across diaphragms 44 and 78
$\Delta P_{EG} = (P_{EG} - P_A)$ = exhaust system differential pressure across diaphragm 56
$F_S$ = force exerted by spring 66
$A_1$ = area of diaphragm 56
$A_2$ = area of diaphragm 44
$K_{EG}$ = constant for exhaust gas flow from reactor 14 of engine 10
$C_{EG}$ = engine 10 exhaust system coefficient of discharge
$A_{EG}$ = engine 10 exhaust system restrictive area
$\rho_{EG}$ = gas density in reactor manifold 14
$K_V$ = constant for venturi 31 flow
$C_V$ = venturi 31 coefficient of discharge
$A_V$ = venturi throat area 32
$\rho_V$ = venturi 31 inlet density
$K$ = ratio of venturi flow constant $K_V$ to exhaust system flow constant $K_{EG}$
$T_V$ = venturi 31 inlet temperature
$T_{EG}$ = reactor manifold 14 gas temperature and variations of the term $$\frac{P_V / T_V}{P_{EG} / T_{EG}}$$

of equation (5) can be neglected, since variations of the gas temperature and pressure in reactor 14 and the air temperature and pressure in pump 18 tend to compensate for each other and the error effect on control of the air flow ratio is negligible.

The embodiment of FIG. 2 utilizes components similar to those used in the embodiment of FIG. 1, and like numerals serve to designate like components. A controller 70 consists of a housing having a portion 74 and a larger diameter portion 75. A pair of first and second diaphragms 78 and 79 of unequal areas are positioned in the portions 74 and 75, respectively, to separate the interior of the housing into first, second intermediate, and third chambers 81, 82, and 83. Conduits 52, 53, and 61 are now connected to chambers 81, 82 and 83, respectively.

In operation, flow of secondary air in passageway 28 of the embodiment of FIG. 2 generates a pressure which is sensed in chamber 82 through conduit 53. The differential pressure developed across diaphragm 79 serves to urge rod 64 in a direction to close valve 38. Flow of secondary air through the venturi throat 32 generates a depressed pressure which is sensed in chamber 81 through conduit 52. The difference in pressures sensed in chambers 82 and 81 exerts a force on diaphragm 78 which urges rod 64 in a direction to open valve 38. As in the embodiment of FIG. 1, with spring 66 removed, the two opposing, varying forces on the respective diaphragms 78 and 79 control positioning of valve 38 and provide a constant air flow ratio as engine air flow increases. With the provision of a tension spring 66, the additionally introduced force acting on diaphragm 78 tends to urge opening of valve 38 which results in an increasing air flow ratio. The substitution of a compression spring 66 serves to provide a decreasing air flow ratio.

The embodiment of FIG. 2 operates more particularly, in accordance with the hereinbefore mentioned equations (1), (2), (3), (4), (5), and (6), except that in equation (6) $P_V$ is substituted for $P_{EG}$.

The embodiment of FIG. 2 is a simpler arrangement than that illustrated in FIG. 1, and avoids the need for sensing the hot gas pressures found in reactor 14.

In the embodiment of FIG. 3, which is somewhat similar to the embodiment of FIG. 1, venturi 32 is eliminated, and a check valve 86, acting as a restrictor, is positioned in passageway 28. Also eliminated is conduit 52, and pressure from reactor 14 is instead supplied to chamber 48 by a branch conduit 88 leading from conduit 62 to housing 42.

In operation, pressure found in reactor 14 is sensed in chamber 58 through conduit 62. The differential pressure thus developed across diaphragm 56 serves to urge rod 64 in a direction to close valve 38. Flow of secondary air through passageway 28 and past check valve 86 generates a pressure which is sensed through conduit 53 and in chamber 49. Conduit 88 serves to also introduce the pressure found in reactor 14 into chamber 48. The difference between the two pressures found in chambers 46 and 48 develops a force on diaphragm 44 which urges rod 64 in a direction to open valve 38. With spring 66 removed, the forces on the respective diaphragms 44 and 56 control positioning of valve 38 as engine air flow varies, but in contrast to the embodiments of FIGS. 1 and 2, with spring 66 removed, the flow ratio tends to increase with increasing engine air flow. With the provision of a tension spring 66, the ratio will increase even more rapidly with increasing engine air flow. On the other hand, the use of a compression spring 66, selected to just balance the natural tendency for flow ratio to increase with increasing engine air flow, will provide for a constant air flow ratio. A compression spring applying relatively greater force will produce a ratio that decreases with increasing engine air flow.

Operation of the embodiment of FIG. 3 is more specifically in accordance with equations (1) and (3) and the following equations:

$$W_P = K_P C_P A_P \sqrt{\Delta P_P \rho_P} \quad \text{Restrictor Flow Equation} \quad (7)$$

$$P_P = P_{EG} + \Delta P_P \quad (8)$$

$$\frac{W_P}{W_P + W_E} = K \frac{C_P A_P}{C_{EG} A_{EG}} \sqrt{\frac{\Delta P_P \, P_P/T_P}{\Delta P_{EG} \, P_{EG}/T_{EG}}} \quad (9)$$

$$(P_P - P_{EG}) A_2 - (P_{EG} - P_A) A_1 - F_S = 0 \quad (10)$$

where:

$K$ = ratio of restrictor 86 flow constant $K_P$ to exhaust system flow constant $K_{EG}$
$C_P$ = restrictor 86 coefficient of discharge
$A_P$ = restrictor 86 area
$P_P$ = restrictor 86 inlet pressure
$K_P$ = constant for restrictor 86 flow
$\Delta P_P = (P_P - P_{EG})$ restrictor 86 differential pressure across diaphragm 44
$\rho_P$ = restrictor 86 inlet density It will be appreciated that the embodiment of FIG. 3 can be modified by relocating check valve 86 upstream of conduit 53 to the position previously occupied by valve 30, as shown in FIGS. 1 and 2, whereby air passageways 17 would serve to restrict flow of air in passage 28.

While specific embodiments of the invention have been illustrated and described, it is to be understood that they are provided by way of example only and that the invention is not to be construed as being limited thereto but only by the scope of the following claims.

What is claimed is:

1. Air flow control apparatus for an internal combustion engine having an exhaust manifold reactor comprising:
   pump means adapted to be driven by the engine for supplying secondary pressurized air to the reactor;
   conduit means connected to said pump means for conveying the pressurized air, said conduit means having a portion for venting the pressurized air to atmosphere;
   air passage means connected to said conduit means intermediate said pump means and said portion and adapted for connection to convey a portion of the pressurized air as secondary air to the exhaust manifold reactor;
   valve means positioned in said conduit means portion for regulating flow of the pressurized air to atmosphere;
   a venturi positioned in said air passage means;
   a first housing;
   a first diaphragm positioned in said first housing to provide first and second chambers, said first chamber being connected to the throat of said venturi and said second chamber being connected to said air passage means immediately upstream of said venturi;
   a second housing; and
   a second diaphragm positioned in said second housing to provide third and fourth chambers, said second diaphragm being connected to said first diaphragm and said valve means for simultaneous movement, said third chamber being adapted for connection to the exhaust manifold reactor, and said fourth chamber being connected to the atmosphere.

2. The air flow control apparatus set forth in claim 1 further comprising:
   means positioned within said first housing in said first chamber for urging said first diaphragm in a direction tending to close said valve means.

3. The air flow control apparatus set forth in claim 1 further comprising:
   means positioned within said first housing in said first chamber for urging said first diaphragm in a direction tending to open said valve means.

4. Air flow control apparatus for an internal combustion engine having an exhaust manifold reactor comprising:
   pump means adapted to be driven by the engine for supplying pressurized air;
   conduit means connected to said pump means for conveying the pressurized air, said conduit means having a portion for venting the pressurized air to atmosphere;
   air passage means connected to said conduit means intermediate said pump means and said portion and adapted for connection to convey a portion of the pressurized air as secondary air to the exhaust manifold reactor;
   valve means positioned in said conduit means portion for regulating flow of the pressurized air to atmosphere;
   check valve means positioned in said air passage means;
   a first housing;
   a first diaphragm positioned in said first housing to provide first and second chambers, said first chamber being adapted for connection to the exhaust manifold reactor, and said second chamber being connected to said air passage means upstream of said check valve means;
   a second housing; and
   a second diaphragm positioned in said second housing to provide third and fourth chambers, said second diaphragm being connected to said first diaphragm and said valve means for simultaneous movement, said third chamber being adapted for connection to the exhaust manifold reactor, and said fourth chamber being connected to the atmosphere.

5. The air flow control apparatus set forth in claim 4 further comprising:

means positioned within said first housing in said first chamber for urging said first diaphragm in a direction tending to close said valve means.

6. The air flow control apparatus set forth in claim 4 further comprising:
means positioned within said first housing in said first chamber for urging said first diaphragm in a direction tending to open said valve means.

7. Air flow control apparatus for an internal combustion engine having an exhaust manifold reactor comprising:
pump means adapted to be driven by the engine for supplying pressurized air;
conduit means connected to said pump means for conveying the pressurized air, said conduit means having a portion for venting the pressurized air to atmosphere;
air passage means connected to said conduit means intermediate said pump means and said portion and adapted for connection to convey a portion of said pressurized air as secondary air to the exhaust manifold reactor;
valve means positioned in said conduit means portion for regulating flow of the pressurized air to atmosphere;
check valve means positioned in said air passage means;
a first housing;
a first diaphragm positioned in said first housing to provide first and second chambers, said first chamber being connected to said air passage means immediately upstream of said manifold reactor;
a second housing;
a second diaphragm positioned in said second housing to provide third and fourth chambers, said second diaphragm being connected to said first diaphragm and said valve means for simultaneous movement, said third chamber being adapted to connection to the exhaust manifold reactor, and said fourth chamber being connected to the atmosphere.

8. The air flow control apparatus of claim 7 and further comprising:
means positioned within said first housing in said second chamber for urging said first diaphragm in a direction tending to close said valve means.

9. The air flow control apparatus set forth in claim 7 further comprising:
means positioned within said first housing in said second chamber for urging said first diaphragm in a direction tending to open said valve means.

10. The air flow control apparatus of claim 7 wherein there is provided in said conduit means a venturi section intermediate said conduit means and said reactor manifold, said second chamber of said first housing being connected to the throat of said venturi.

11. The air flow control apparatus of claim 10 and further comprising:
means positioned within said first housing in said second chamber for urging said first diaphragm in a direction tending to close said valve means.

12. The air flow control apparatus set forth in claim 10 further comprising:
means positioned within said first housing in said second chamber for urging said first diaphragm in a direction tending to open said valve means.

13. The air flow control apparatus of claim 7 wherein the second chamber of said first housing is connected to said reactor manifold.

14. The air flow control apparatus of claim 13 and further comprising:
means positioned within said first housing in said second chamber for urging said first diaphragm in a direction tending to close said valve means.

15. The air flow control apparatus set forth in claim 13 further comprising:
means positioned within said first housing in said second chamber for urging said first diaphragm in a direction tending to open said valve means.

* * * * *